(Model.)

G. G. F. BOSWELL.
DRIVE CHAIN.

No. 403,909. Patented May 28, 1889.

Witnesses
H. P. Hood
A. M. Hood

Inventor
George G. F. Boswell

UNITED STATES PATENT OFFICE.

GEORGE G. F. BOSWELL, OF INDIANAPOLIS, INDIANA, ASSIGNOR OF TWO-FIFTHS TO JOSEPH E. BOSWELL AND JAMES F. BOSWELL, BOTH OF SAME PLACE.

DRIVE-CHAIN.

SPECIFICATION forming part of Letters Patent No. 403,909, dated May 28, 1889.

Application filed January 2, 1889. Serial No. 295,133. (Model.)

*To all whom it may concern:*

Be it known that I, GEORGE G. F. BOSWELL, a citizen of the United States, residing at Indianapolis, in the county of Marion and State of Indiana, have invented a new and useful Improvement in Drive-Chains, of which the following is a specification.

My invention relates to an improvement in that class of drive-chains which are flexible in two directions substantially at right angles to each other, of which an example is found in Patent No. 393,491. In the chain shown in said patent the flat links, having a cylindrical bar at one end and an eye at the other end and adapted to engage the teeth of a sprocket-wheel, are connected by a short plate having at one end a hook which engages the bar of one link and at the other end a boss which enters the eye of the next link, the boss projecting toward the back of the hook and having its axis at right angles thereto. In putting said chain together the boss of the plate is permanently secured to the eye of the link by a rivet and washer, and the hook is engaged with the bar of the next link by sliding them together laterally, the side of the link being provided with a notch to permit the passage of the point of the hook, in a manner well known in drive-chain construction. Chains of this class when put together in this manner are liable to become disconnected when bent laterally, as in passing around guide-pulleys, and the plates must be riveted to the links at the factory before shipment.

The object of my improvement is to avoid these difficulties.

The accompanying drawings illustrate my invention.

Figure 3:
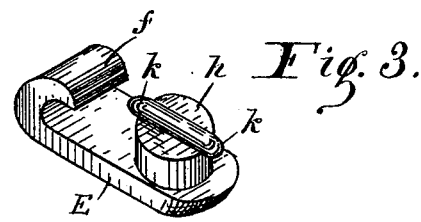
Figure 2:
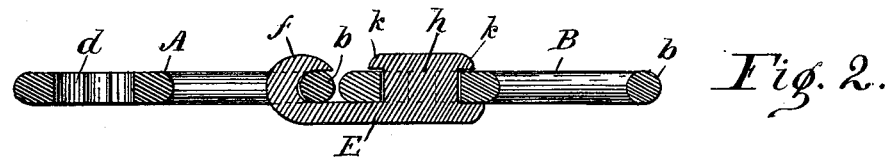
Figure 1:
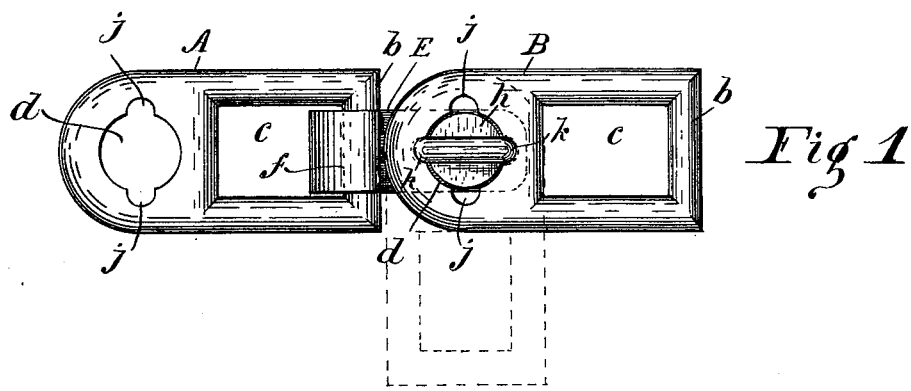

Figure 1 is a plan of two links and their connecting-plate. Fig. 2 is a longitudinal section of the same. Fig. 3 is a view in perspective of the plate which connects the links.

A and B are two like flat links, each having at one end a cylindrical bar, *b*, and an opening, *c*, adapted to receive the tooth of a sprocket-wheel, and at the other end a circular eye, *d*, having its axis at right angles to the axis of bar *b*.

E is a flat plate, having one end turned up to form a hook, *f*, adapted to receive the bar *b* of link A, and provided at the other end with a cylindrical boss, *h*, adapted to enter and fit loosely the eye *d* of link B. The arrangement of hook *f* and boss *h* is such that they both project from the same side of plate E, and there is sufficient space between the end of the hook and the boss to allow the bar *b* to pass, which space is filled by the material of link B surrounding its eye *d*. By this construction the bar *b* of link A, having been engaged with the hook *f*, is retained in the hook by the next link, B, when it is engaged with the boss *h*. Link B may be retained on boss *h* by a rivet and washer, if it is thought desirable; but I prefer that they should be separably connected, so that the pieces comprising the chain may be shipped in bulk and put together without tools. For this purpose I cut recesses *j j* in opposite sides of the eye *d* and provide corresponding lugs, *k k*, projecting from the upper portion of boss *h*.

In putting the boss and the eye together the link is turned at right angles to the plate, as indicated in dotted lines, Fig. 1, in which position the recesses *j* register with the lugs *k* and are turned on the boss out of register when the link is brought into line with the plate.

I claim as my invention—

1. In a drive-chain, the combination of two like links, each having a straight cylindrical bar at one end, a circular eye at the other end, and an intermediate opening adapted to receive the tooth of a sprocket-wheel, and a separate plate arranged to connect said links, having a hook adapted to engage the straight cylindrical bar of one of the links and a cylindrical boss adapted to engage the eye of the other link, and provided with retaining-lugs, said hook and boss having their axes at right angles to each other, both projecting from the same side of the plate and arranged substantially as shown and described, whereby one link, when connected with the hook on the plate, is held in place by the engagement of the next link with the boss on said plate, substantially as specified.

2. In a drive-chain, the link having bar $b$, the link having eye $d$ and recesses $j\,j$, and the plate having hook $f$, boss $h$, and lugs $k\,k$, all combined and arranged to co-operate substantially as specified.

GEORGE G. F. BOSWELL.

Witnesses:
H. P. HOOD,
A. M. HOOD.